(12) United States Patent
Hellyer et al.

(10) Patent No.: US 11,263,130 B2
(45) Date of Patent: Mar. 1, 2022

(54) DATA PROCESSING FOR ALLOCATING MEMORY TO APPLICATION CONTAINERS

(71) Applicant: International Business Machines Corporation, Armonk, NY (US)

(72) Inventors: Howard Hellyer, Kings Worthy (GB); Adam John Pilkington, Eastleigh (GB); Richard Chamberlain, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/508,905

(22) Filed: Jul. 11, 2019

(65) Prior Publication Data

US 2021/0011848 A1 Jan. 14, 2021

(51) Int. Cl.
*G06F 12/00* (2006.01)
*G06F 12/06* (2006.01)
*G06F 12/02* (2006.01)
*G06F 9/455* (2018.01)

(52) U.S. Cl.
CPC ...... *G06F 12/0646* (2013.01); *G06F 9/45558* (2013.01); *G06F 12/0253* (2013.01); *G06F 2009/45583* (2013.01); *G06F 2212/152* (2013.01); *G06F 2212/657* (2013.01)

(58) Field of Classification Search
None
See application file for complete search history.

(56) References Cited

U.S. PATENT DOCUMENTS

| 9,547,520 B1 | 1/2017 | Bailey et al. |
| 2009/0144349 A1* | 6/2009 | Phillips ............... G06F 12/0261 |
| 2014/0033213 A1* | 1/2014 | Hudson ............... G06F 12/0253 |
| | | 718/102 |
| 2016/0239343 A1 | 8/2016 | Holt |
| 2016/0253103 A1 | 9/2016 | Foley |
| 2018/0046572 A1 | 2/2018 | Bobroff et al. |
| 2019/0042406 A1* | 2/2019 | Guniguntala ....... G06F 9/45504 |

OTHER PUBLICATIONS

IBM, "Generational Concurrent Garbage Collector," https://www.ibm.com/support/knowledgecenter/en/SSYKE2_8.0.0/com.ibm.java.vm.80.doc/docs/mm_gc_generational.html, printed Jun. 10, 2019, 3 pgs.

(Continued)

*Primary Examiner* — Midys Rojas
(74) *Attorney, Agent, or Firm* — Mark Bergner (57) ABSTRACT

A system and related method for managing memory in data processing comprises allocating each of a plurality of application containers a respective portion of a memory communicatively coupled to a plurality of processing units. The method further comprises allocating each of the plurality of application containers a respective group of the plurality of processing units and allocating, to each of the plurality of application containers, nursery and tenured heap spaced in the memory. The method then comprises performing, responsive to a request from an application container, garbage collection from the nursery and tenured heap spaces allocated to the application container.

20 Claims, 6 Drawing Sheets

(56) References Cited

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Parafina, S., "Improved Docker Container Integration with Java 10—Docker Blog," https://blog.docker.com/2018/04/improved-docker-container-integration-with-java-10/, printed Jul. 9, 2019, 2 pgs.

SAP, "How the Shared Garbage Collector Works," https://help.sap.com/viewer/e9ba7e4d7a2c44e684aa3eecd10278f5/7.5.7/en-US/4df08c0bc70c00aae10000000a42189e.html, printed Jul. 9, 2019, 2 pgs.

Schad, J. "Nobody puts Java in a container—JAXenter," https://jaxenter.com/nobody-puts-java-container-139373.html, printed Jul. 9, 2019, 7 pgs.

Unknown, "[JDK-8146115] Improve docket container detection and resource configuration usage," https://bugs.openjdk.java.net/browse/JDK-8146115, printed Jul. 9, 2019, 1 pg.

Unknown, "Java & Docker: Java 10 improvements strengthen the friendship!", https://aboullaite.me/docker-java-10/, printed Jul. 9, 2019, 2 pgs.

Briggs, K., "Memory management in Eclipse OpenJ9," Jan. 11, 2019, https://developer.ibm.com/articles/garbage-collection-tradeoffs-and-tuning-with-openj9/, printed Jul. 11, 2019, 16 pgs.

* cited by examiner

DATA PROCESSING FOR ALLOCATING MEMORY TO APPLICATION CONTAINERS

BACKGROUND

Disclosed herein is a system and related method for data processing, and more particularly, a data processing system and method for allocating memory to application containers.

A traditional data processing system providing a containerized environment (e.g., a cloud deployment of a containerized web application) may typically run a large number of similar applications. The applications are isolated from each other within containers, but often run similar workloads using the same managed runtime. For example, a data processing system may support a cluster of dynamic application server runtime environments, all of which run on instances of the same software stack.

With each application being isolated in an individual container, the applications are not able to cooperate in order to enable more efficient use of the available physical resources in the system, such as memory and processing units. To address this, conventional systems allocate more physical resources to individual applications. However, this approach fails to optimize the usage of the physical resources across all the applications in the system, preventing efficient use of the memory and the processing units in the system.

SUMMARY

Disclosed herein is a data processing system and related method for allocating memory to application containers. A computer program product including computer program code for implementing the method when executed by a controller unit is also disclosed.

A data processing system, according to some embodiments, is also provided that comprises a memory and a plurality of processing units communicatively coupled to the memory. The system further comprises a container management component configured to allocate each of a plurality of application containers to a respective portion of the memory and a respective group of the plurality of processing units. The system further comprises a memory management service configured to allocate, to each of the plurality of application containers, nursery and tenured heap spaces in the memory. The memory management service is further configured to perform, responsive to a request from an application container, garbage collection from the nursery and tenured heap spaces allocated to the application container.

The method, according to some embodiments, comprises allocating each of a plurality of application containers a respective portion of a memory communicatively coupled to a plurality of processing units. The method further comprises allocating each of the plurality of application containers a respective group of the plurality of processing units and allocating, to each of the plurality of application containers, nursery and tenured heap spaced in the memory. The method then comprises performing, responsive to a request from an application container, garbage collection from the nursery and tenured heap spaces allocated to the application container.

A computer program product for managing memory in data processing is provided that, comprises a computer readable storage medium having program instructions embodied therewith, the program instructions executable by a processing unit to cause the processing unit to perform a method according to some embodiments.

According to another aspect of the invention, there is provided a processing system comprising at least one processor and the computer program product according to an embodiment. The at least one processor is adapted to execute the computer program code of said computer program product.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise noted, in addition to any combination of features belonging to one type of subject-matter, any combination between features relating to different subject-matter, in particular, between features of the methods and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The Figures are merely schematic and are not drawn to scale. The same reference numerals may be used throughout the Figures to indicate the same or similar parts. In the context of the present disclosure, where embodiments constitute a method, such a method may be a process for execution by a computer, i.e., may be a computer-implementable method. The various steps of the method may therefore reflect various parts of a computer program, e.g., various parts of one or more algorithms. Also, in the context of the present disclosure, a system may be a single device or a collection of distributed devices that are adapted to execute one or more embodiments of the methods disclosed herein. For instance, a system may be a personal computer (PC), a server or a collection of PCs and/or servers connected via a network such as a local area network, the Internet, and so on, to cooperatively execute at least some embodiments of the methods disclosed herein.

Each container within a system has a limited allocation of memory and central processing unit (CPU) resources. The use of such memory and processing units for each individual container may be optimized by the runtime environment within the individual containers. Applications in a managed runtime environment, e.g., Java™, traditionally use a generational garbage collection algorithm for automatic memory management. Generational garbage collection typically implements a nursery heap space for recently created objects. The nursery heap space may consist of two memory spaces of the same size; an allocate space and a survivor space. Garbage collection in the nursery heap space, referred to as nursery collection, may be implemented by a copy-collector. During nursery collection, live objects to be retained are copied from the allocate space to the survivor space. The live objects to be retained may also be copied to a tenured heap space, separate from the nursery heap space, depending on the period of time the live objects have been in the nursery heap space. In response to the completion of the nursery collection, the survivor space may be switched to become the new allocated space for the application.

Various concepts for allocating memory to application containers are discussed herein. Such concepts may improve the efficiency of memory and processing unit use in a physical machine during data processing. Accordingly, embodiments may be implemented in conjunction with containerized applications running on a shared software stack in a physical machine.

A memory management service may be utilized for the allocation of memory. Such a memory management service may be configured to allocate, to each of a plurality of application containers, nursery and tenured heap spaces in the memory. The memory management service may then also perform garbage collection from the nursery and tenured heap spaces allocated to an application container.

The managing of memory in data processing discussed herein may optimize the use of memory and processing units for managed runtimes in application containers running on a physical machine. By way of example, some embodiments may be implemented in conjunction with a physical machine supporting a cluster of dynamic application server runtime environments, e.g., servers, all of which are running on instances of a shared software stack, e.g., a Java™ software stack. Some embodiments may thus enable containerized applications running on the same software stack to delegate a portion of their heap memory management and garbage collection workload to a shared memory management service running in the same physical machine. Accordingly, the memory and processing units in the physical machine may then be used more efficiently for specific memory heap allocation and garbage collection operations. Some embodiments may therefore provide for reduced memory consumption and faster garbage collection for managed runtimes in parallel containers.

In some embodiments, the memory management service may be configured to perform, responsive to a request from an application container, garbage collection by executing a plurality of operations on a set of the plurality of processing units in parallel. This enables the garbage collection to be performed using the plurality of processing units (for example, all the processing units available in the physical machine) as opposed to being limited to the processing unit allocated to the individual application container. This increases the number of processing units available for use during the garbage collection, optimizing the speed and efficiency of the system.

Garbage collection (GC) may be implemented as a service provided by a managed runtime to simplify memory management for application developers. Generational Garbage collection is a particular GC strategy that has benefits for managing short-lived objects such as transactional applications. In this way, the memory management service is enabled to allocate shared memory for the nursery heap spaces for each of the application containers, optimizing the process of garbage collection. Consequently, the use of the memory available to the system may be optimized and the required quantity of processing units may be reduced.

Garbage collection may only occur when application code is not running. For example, garbage collection may not be in progress during the running of application code, such that the memory allocated to some of the nursery heap spaces of the application containers may be unused during this period of time (i.e., a subset of all the spaces may be unused). This enables the memory allocated to the nursery heap spaces to be used for other applications. In this way, the total memory requirement for the system may be reduced by an amount expressed by Equation I:

$$\text{Reduction in Memory Requirement} = N\left(\frac{S}{2}\right) - 1, \qquad (I)$$

wherein:
N is the total number of application containers; and
S is the memory size of a nursery heap space corresponding to each of the application
containers.

The memory management service may provide heap management and garbage collection for the application containers. Heap management may comprise the memory management service allocating tenured and nursery heap spaces to the application containers. The memory management service may enable the size and quantity of heap spaces for each application container to be selected. Further, the quantity of the set of the plurality of processing units implemented by the garbage collection may be configured in response to a user selection. Additionally, the quantity of the set of the plurality of processing units may be selected automatically based on the number of available processing units in the plurality of processing units at the time of the selection. The garbage collection may comprise nursery collection. Nursery collection may be the process of collecting objects from the nursery heap spaces. Each application container may request tenured heap and nursery heap spaces from the memory management service. By way of example, each of the nursery heap spaces may comprise an allocate space and a survivor space.

In some embodiments, the request from an application container may be responsive to the allocated space corresponding to the nursery heap space allocated to the application container being full. For example, an application container may have filled its corresponding allocate space and may request garbage collection from the memory management service. In this way, garbage collection may be triggered only when required, for example when the nursery heap space is running out of available memory. This improves the efficiency of the memory management service.

The memory management service, prior to the garbage collection, may provide a survivor space for use in the garbage collection. Further, the memory management service, in response to completing the garbage collection, may provide the survivor space to the application container and receive the allocate space from the application container. Thus, the allocate space and the survivor space may switch roles. The new survivor space may be entirely empty of objects, enabling the memory of the new survivor space to be available for the next garbage collection.

In some embodiments, the memory management service may be configured to allocate nursery and tenured heap spaces in the memory based on timing statistics relating to an amount of time required to complete garbage collection. This may help to optimize the efficiency of the memory management service. By way of example, the set of the plurality of processing units may comprise more processing units than the group of the plurality of processing units allocated to the application container the request is from. Thus, additional processing units may be allocated for use in garbage collection over the number allocated for normal processing in the application container. In this way, the memory management service may perform the garbage collection on behalf of the application container using additional processing units for parallel garbage collection operations. The garbage collection operations may, for example, include parallel marking and sweeping. The parallel marking and sweeping may be used to determine which objects are live (i.e., in use in a running instance of an application).

The memory management service may be configured to determine the quantity of nursery collections enabled at one time. In this way, the service may be enabled to efficiently allocate only the required allocate spaces for the application containers, as well as a predetermined number of survivor spaces. For example, the number of allocated survivor spaces may equate to the quantity of required nursery collections. In this example, a maximum number of parallel nursery collections may be two, such that only two survivor spaces may be required to be allocated. In this way, the total memory requirement saved may be expressed by Equation II:

$$N\left(\frac{S}{2}\right) - 2, \qquad (II)$$

wherein:
N is the total number of application containers; and
S is the memory size of a nursery heap space corresponding to each of the application containers.

In some embodiments, the memory management service may be configured to assign the application container to a garbage collection queue in response to the request from the application container and a maximum number of parallel nursery collections being reached. In this way, the nursery collection requested by the application container may be conducted once one of the parallel nursery collections being completed at that point in time is finished and processing units are made available for use. This reduces the risk of too many nursery collections being undertaken in parallel, consequently reducing the risk of decreased efficiency and diminished performance of the system.

In some embodiments, the maximum number of parallel nursery collections may be based on queue statistics relating to an amount of time application containers wait in the garbage collection queue. In this way, the risk of increasing queuing time due to a large quantity of parallel nursery collections may be reduced, improving the efficiency of the memory management service.

In response to the memory management service determining, during nursery collection, that an application container has filled its corresponding tenured heap spaces, the memory management service may additionally perform a garbage collection of the tenured heap spaces. The memory management service may perform this additional garbage collection using additional processing units for parallel garbage collection operations as available to the service.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
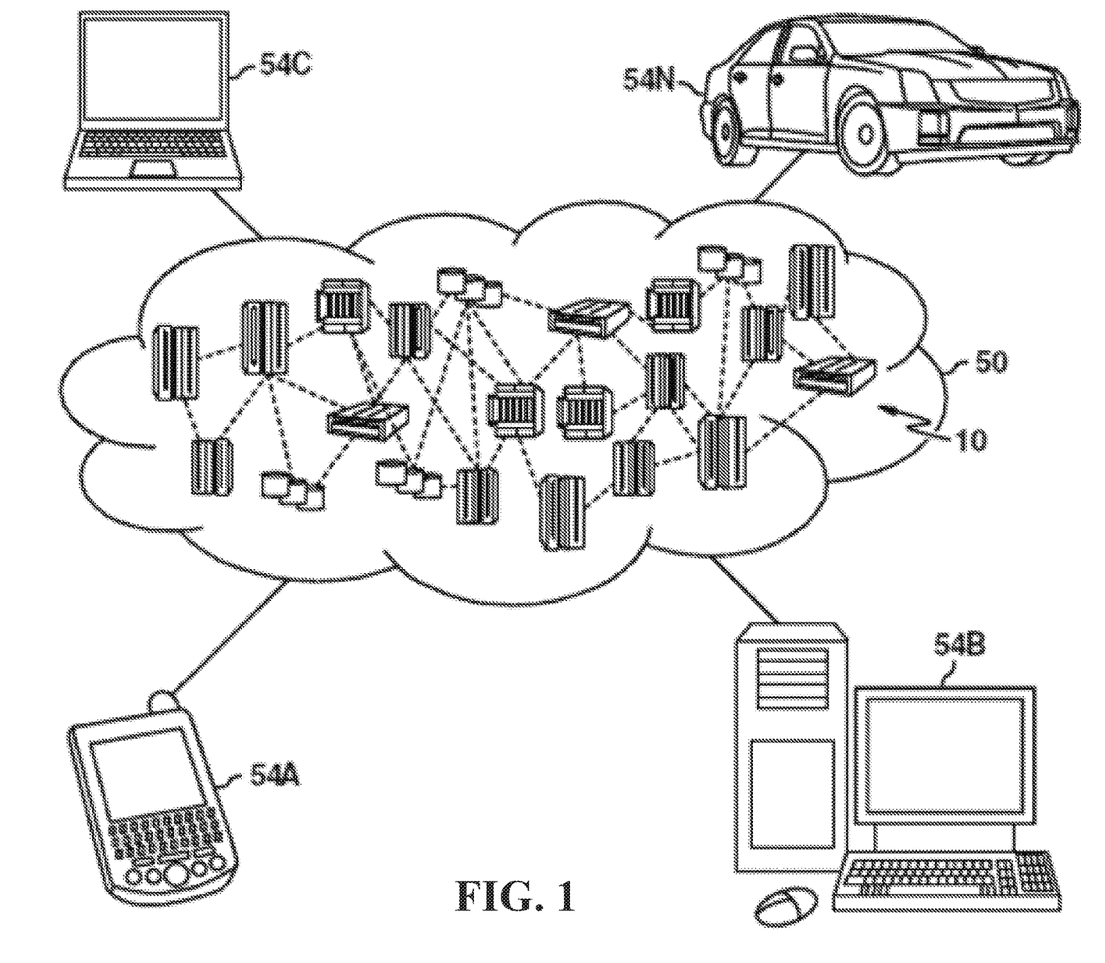
FIG. 1 depicts a cloud computing environment according to some embodiments disclosed herein.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
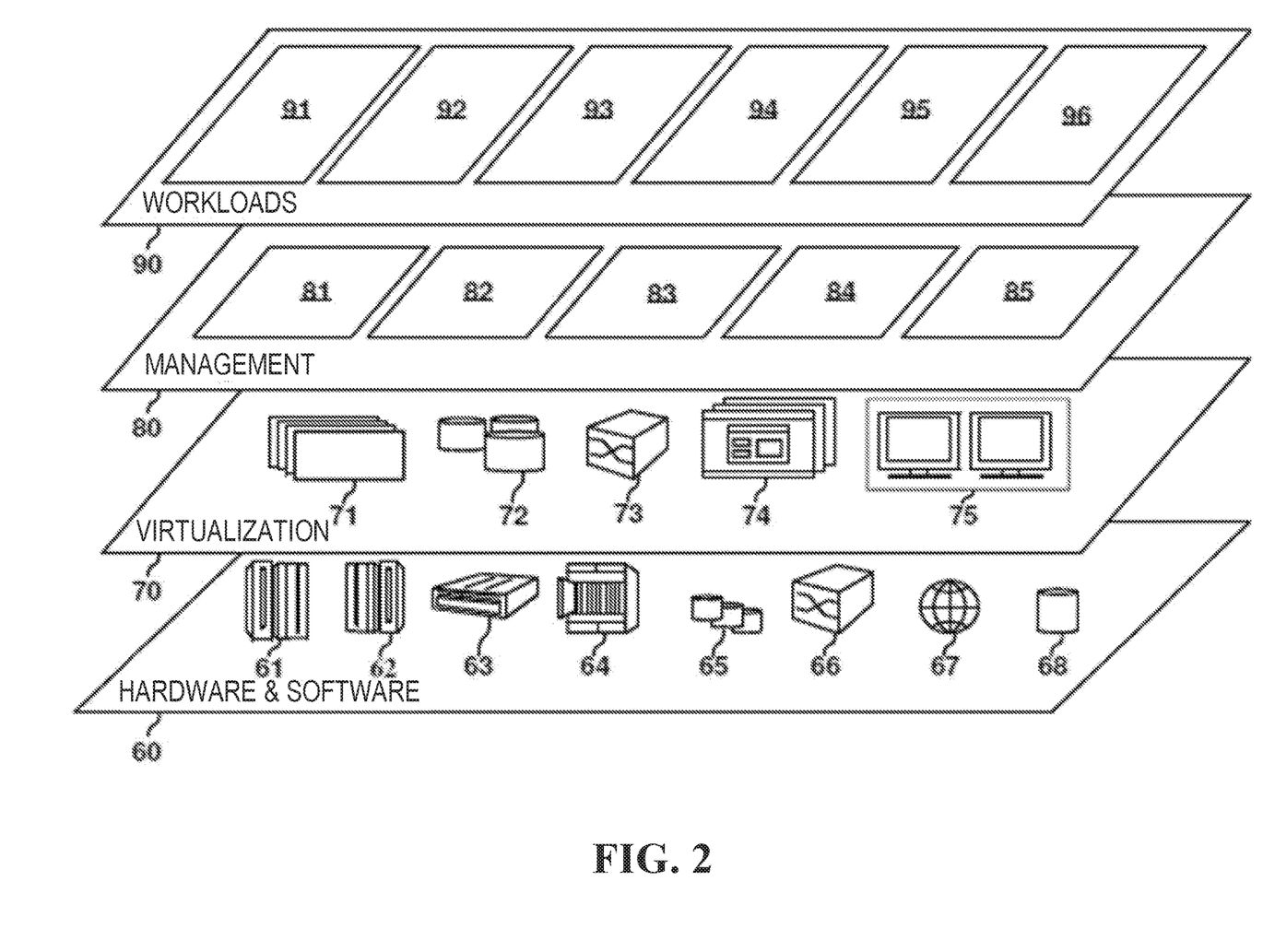
FIG. 2 depicts abstraction model layers according to some embodiments disclosed herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
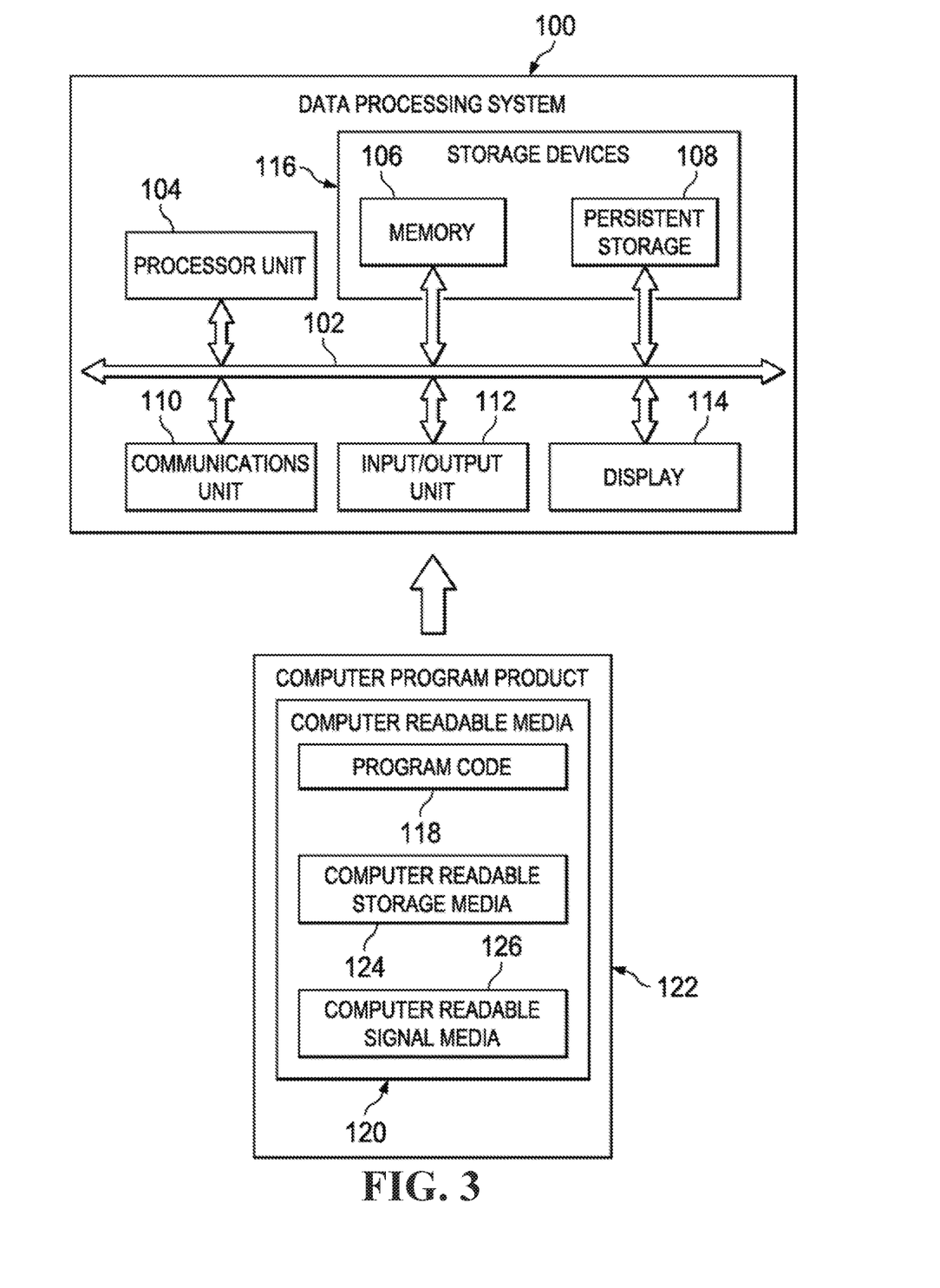
FIG. 3 is a block diagram of a data processing system according to some embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code 118, computer usable program code, or computer readable program code that may be read and executed by a processor in the processor unit 104. The program code 118 in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 3 may be varied from the illustrative examples shown.

Figure 4:
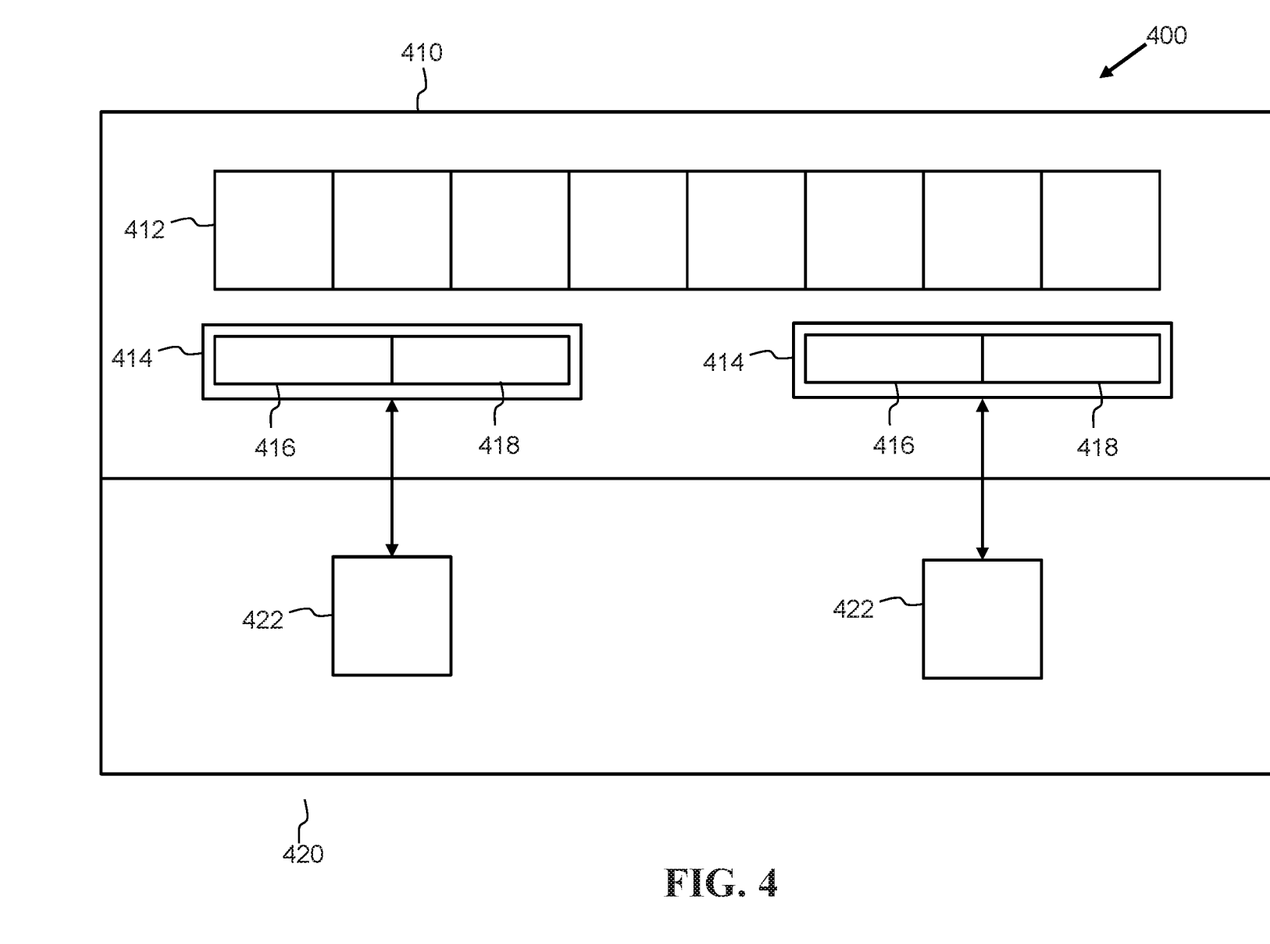
FIG. 4 is a block diagram of an exemplary embodiment of a system for managing memory in data processing according to some embodiments disclosed herein.

FIG. 4 is a block diagram according to some embodiments of a system 400 for managing memory in data processing operations, according to some embodiments. The system 400 may be implemented, by way of example, in a DPS 100, as described above. The system 400 may comprise a managed heap region 410 and an application container region 420. The application container region 420 may comprise a plurality of application containers 422 (in this example, two application containers are depicted). Each of the plurality of application containers 422 may be allocated, using a container manager, to a respective portion of memory and a respective group of a plurality of processing units. The managed heap region 410 may comprise tenured heap spaces 412 and nursery heap spaces 414. The tenured heap spaces 412 and the nursery heap spaces 414 may be managed by the memory management service on behalf of the plurality of application containers 422.

Objects may be created in the nursery heap spaces 414 and may be moved into the tenured heap spaces 412 during a garbage collection operation, once the objects have been reachable for a predetermined number of garbage collections, referred to as a "tenured age". Each of the nursery heap spaces 414 may comprise an allocate space 416 and a survivor space 418. Objects may be allocated into the allocate space 416. When the allocate space 416 is filled, a garbage collection process may be initiated. During the garbage collection, reachable objects may be copied into the survivor space 418 or the tenured heap spaces 412, depending on if they have reached the tenured age. Objects in the nursery heap spaces 414 that are not reachable remain untouched during the garbage collection. When all the reachable objects have been copied, the allocate space 416 and the survivor space 418 switch roles. The new survivor space 418 is now empty of reachable objects and is available for the next garbage collection.

An object is unreachable when there are no longer any references (or links) to it, or those references (or links) are themselves from unreachable objects. Heap objects, in a language that has only strong references, are either reachable or unreachable from the program. A reachable object set is determined by the set of class variables and method variables in the program pointing to heap objects. An object is also reachable if there is another reachable object pointing to it. A chain of references from a root set of the program to a heap object is called reachability path. An object may also have more than one reachability path to it, or it may also have no reachability path to it. If the object has no reachability path, (unreachable) it may be deemed garbage and may be immediately collected by the garbage collector. An object enters an unreachable state when no more strong references to it exist. When an object is unreachable, it is a candidate for collection. Because an object is a candidate for collection does not necessarily mean it will be immediately collected. The process may be free to delay collection until there is an immediate need for the memory being consumed by the object.

Figure 5:
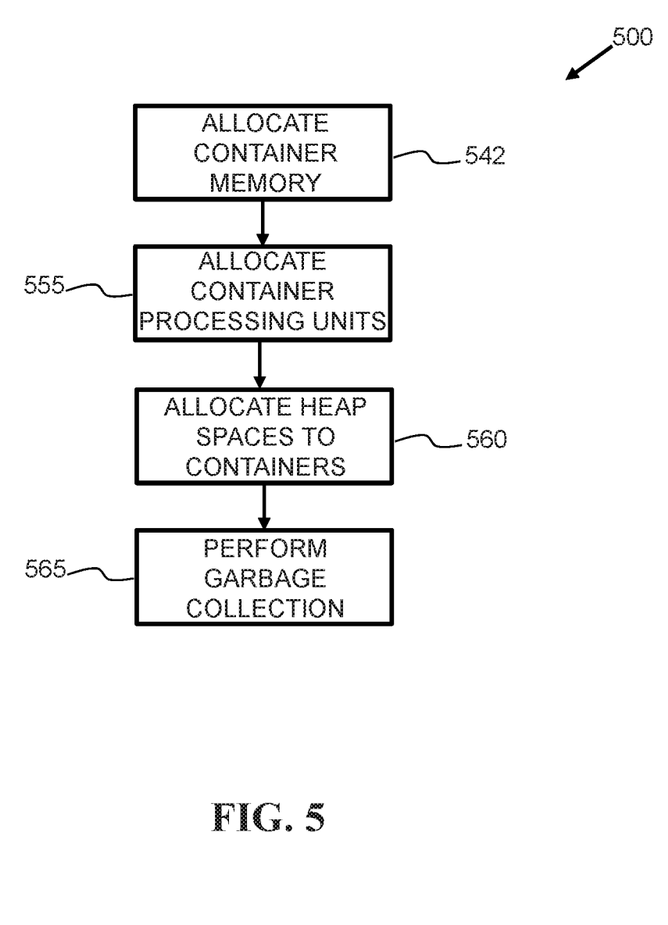
FIG. 5 is a flow chart of a computer-implemented method for managing memory in data processing according to some embodiments disclosed herein.

FIG. 5 is a flow chart of a computer-implemented process 500 for processing data according to some embodiments. Such a process 500 may execute, by way of example, in the context of the system 400 as described above, and may allocate memory to application containers 422 to enable reduced memory consumption and/or faster garbage collection for managed runtimes in a parallel environment.

Operation 510 comprises allocating to each of a plurality of application containers 422 a respective portion of a memory, such as a memory 106, communicatively coupled to a plurality of processors, such as processor 104. Such an allocation may be performed utilizing operating system calls for allocating memory units. Operation 520 comprises allocating each of the plurality of application containers 422 to a respective group of the plurality of processing units 106. For example, the memory management service may be started on a physical machine, such as the DPS 100, in preparation for use by a plurality of application containers 422 running on the same machine 100.

Operation 530 comprises allocating, to each of the plurality of application containers 422, nursery 414 and tenured 412 heap spaces in the memory 106. In some embodiments, the memory management service provides heap management and garbage collection for the plurality of application containers 422. The service may allocate tenured 412 and nursery 414 heap spaces and perform garbage collection for these heap spaces when requested. In some embodiments, the memory management service enables a size and quantity of heap spaces 412 and/or 414 for each application container 422 to be selected. Further, the quantity of processors 104 or processing capacity implemented by the garbage collection may be configured in response to a user selection. Operation 540 comprises performing, responsive to a request from an application container 422, garbage collection from the nursery 414 and tenured 412 heap spaces allocated to the application container 422.

Figure 6:
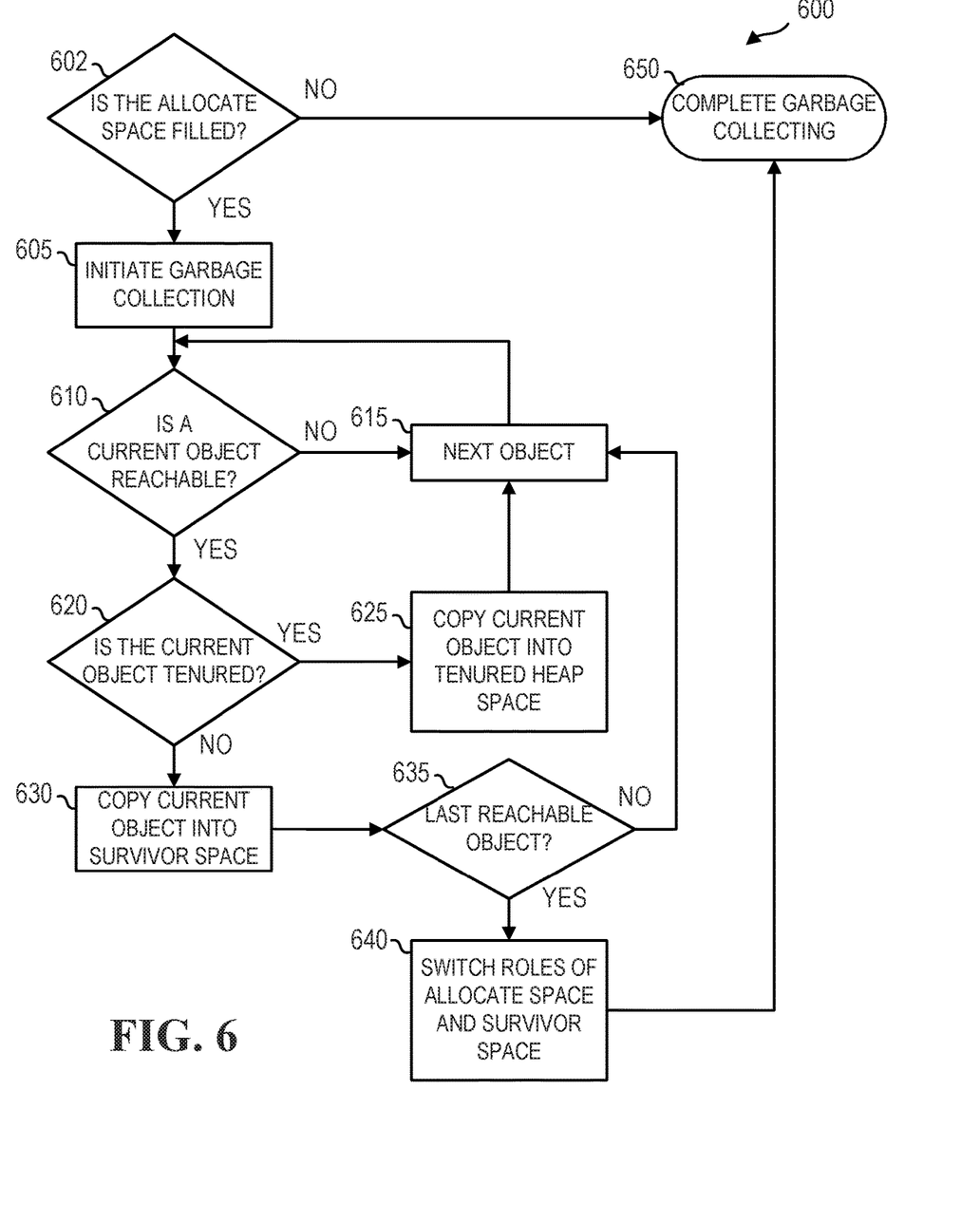
FIG. 6 is a flowchart of a garbage collection process, according to some embodiments according to some embodiments disclosed herein.

FIG. 6 is a flowchart of an example of a garbage collection process 600, such as, for example, operation 540, and ties in with the discussion of FIG. 4 above. In operation 602, a test is made to determine if the allocate space 416 is filled. If not (602: NO), then at operation 650, the garbage collecting is complete. If so (602: YES), garbage collection is initiated at operation 605. In operation 610, a determination is made as to whether an object is reachable in the nursery heap space 414. If not (610: NO), then in operation 615, the process moves on to the next object. If so (610: YES), then, in operation 620, a determination is made as to whether the current object is tenured, as discussed above. If so (620: YES), then, in operation 625, the current object is copied into the tenured heap space 412, and moves to operation 615 in which the process moves on to the next object. If not (620: NO), then, in operation 630, the current object is copied into the survivor space 418.

A further determination is made, in operation 635, as to whether the current object is the last reachable object in the nursery heap space 414. If not (635: NO), then the process moves to operation 615 in which the process moves on to the next object. If so (635: YES), then, in operation 640, the roles of the allocate space 416 and the survivor space 418 are switched in anticipation of the next garbage collection process. The garbage collecting is completed in operation 650.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer.

What is claimed is:

1. A data processing system comprising:
   a memory;
   a plurality of processing units communicatively coupled to the memory;
   a container management component configured to allocate each of a plurality of application containers to:
   a respective portion of the memory; and
   a respective group of the plurality of processing units; and
   a memory management service configured to:
   allocate, to each of the plurality of application containers, nursery heap spaces that hold newly created objects, and tenured heap spaces that hold objects reachable for a predetermined number of garbage collection cycles in the memory; and
   perform, responsive to a request from one of the plurality of application containers, garbage collection from the nursery and tenured heap spaces allocated to the application container.

2. The system of claim 1, wherein the memory management service is configured to perform, responsive to a request from an application container, garbage collection by executing a plurality of operations on a set of the plurality of processing units in parallel.

3. The system of claim 2, wherein the set of the plurality of processing units comprises more processing units than the group of the plurality of processing units allocated to the application container the request is from.

4. The system of claim 1, wherein the memory management service is configured to allocate nursery and tenured heap spaces in the memory based on timing statistics relating to an amount of time required to complete garbage collection.

5. The system of claim 1, wherein the garbage collection comprises nursery collection that constitutes garbage collection within the nursery heap.

6. The system of claim 5, wherein the memory management service is configured to assign the application container to a garbage collection queue in response to the request from the application container and a maximum number of parallel nursery collections being reached.

7. The system of claim 6, wherein the maximum number of parallel nursery collections is based on queue statistics relating to an amount of time application containers wait in the garbage collection queue.

8. The system of claim 1, wherein:
   each of the nursery heap spaces comprises an allocate space and a survivor space;
   responsive to a determination that a current object is non-tenured, the memory management service moves a reachable object from the allocate space to the survivor space; and
   the determination that a current object is non-tenured comprises determining that the current object has been reachable for less than a predetermined number of garbage collections.

9. The system of claim 8, wherein the request for garbage collection from an application container is responsive to the allocate space being full, wherein the allocate space corresponds to the nursery heap space allocated to the application container.

10. The system of claim 8, wherein the memory management service, prior to the garbage collection, provides a survivor space for use in the garbage collection.

11. The system of claim 8, wherein the memory management service, in response to completing the garbage collection, provides the survivor space to the application container and receives the allocate space from the application container.

12. The system of claim 8, wherein the memory management service:
responsive to a determination that a current object is tenured, moves a reachable object from the allocate space to a tenured heap space.

13. The system of claim 12, wherein the determination that a current object is tenured or non-tenured is based on the current object being reachable for a predetermined number of garbage collections.

14. The system of claim 8, wherein the memory management service, responsive to a determination that the current object is a last reachable object, switches roles of the allocate space and the survivor space.

15. A computer program product for processing data, the computer program product comprising a computer readable storage medium having program instructions embodied therewith, the program instructions executable by a controller unit to cause the controller unit to perform:
allocating each of a plurality of application containers a respective portion of a memory communicatively coupled to a plurality of processing units;
allocating each of the plurality of application containers a respective group of the plurality of processing units;
allocating, to each of the plurality of application containers, nursery heap spaces that hold newly created objects, and tenured heap spaces that hold objects reachable for a predetermined number of garbage collection cycles in the memory; and
performing, responsive to a request from an application container, garbage collection from the nursery and tenured heap spaces allocated to the application container.

16. The computer program product of claim 15, wherein:
each of the nursery heap spaces comprises an allocate space and a survivor space; and
the computer-readable program code is further configured to cause the controller unit to perform:
responsive to a determination that a current object is non-tenured, moving a reachable object from the allocate space to the survivor space;
responsive to a determination that a current object is tenured, moving a reachable object from the allocate space to a tenured heap space; and
responsive to a determination that the current object is a last reachable object, switching roles of the allocate space and the survivor space.

17. The computer program product of claim 15, wherein the computer-readable program code is further configured to cause the controller unit to perform:
responsive to a request from an application container, garbage collection by executing a plurality of operations on a set of the plurality of processing units in parallel.

18. A computer-implemented method for processing data, the method comprising:
allocating each of a plurality of application containers a respective portion of a memory communicatively coupled to a plurality of processing units;
allocating each of the plurality of application containers a respective group of the plurality of processing units;
allocating, to each of the plurality of application containers, nursery heap spaces that hold newly created objects, and tenured heap spaces that hold objects reachable for a predetermined number of garbage collection cycles in the memory; and
performing, responsive to a request from an application container, garbage collection from the nursery and tenured heap spaces allocated to the application container.

19. The method according to claim 18, further comprising:
determining that a current object is non-tenured;
responsive to the determining that the current object is non-tenured, moving a reachable object from an allocate space to a survivor space, wherein the determination that a current object is non-tenured comprises determining that the--current object has been reachable for less than a predetermined number of garbage collections;
the method further comprising:
determining that the current object is tenured; and
responsive to the determining that the current object is tenured, moving a reachable object from an allocate space to a tenured heap space.

20. The method according to claim 19, further comprising:
determining that the current object is a last reachable object;
responsive to the determining that the current object is a last reachable object, switching roles of the allocate space and the survivor space.

* * * * *